United States Patent [19]

Burke

[11] Patent Number: 5,475,372
[45] Date of Patent: Dec. 12, 1995

[54] EARTHQUAKE DETECTOR MOTION SENSITIVE DEVICE

[76] Inventor: Robert L. Burke, 11870 Rustic Pl., Fontana, Calif. 92337

[21] Appl. No.: 258,274

[22] Filed: Jun. 10, 1994

[51] Int. Cl.⁶ .................................................. G08B 21/00
[52] U.S. Cl. .................. 340/690; 340/687; 200/61.45 R
[58] Field of Search ..................................... 340/690, 689, 340/669, 686, 687, 540; 200/61.45 R, 61.52, 61.51, 61.48

[56] References Cited

U.S. PATENT DOCUMENTS

| | | | |
|---|---|---|---|
| 2,448,597 | 9/1948 | Jolley et al. | 340/689 |
| 2,689,341 | 9/1954 | Holst | 340/690 |
| 2,826,655 | 3/1958 | Wurm | 200/61.51 |
| 3,359,550 | 12/1967 | Christensen | 200/61.51 |
| 3,709,030 | 1/1973 | Aselman, Jr. | 200/61.52 |
| 3,725,890 | 4/1973 | Cirino | 200/61.51 |
| 4,012,611 | 3/1977 | Petersen | 200/61.45 R |
| 4,028,510 | 6/1977 | Yamaura et al. | 200/61.45 R |
| 4,214,238 | 7/1980 | Adams et al. | 340/690 |
| 4,262,289 | 4/1981 | Rivera | 340/690 |
| 4,271,407 | 6/1981 | Kehrman et al. | 340/690 |
| 4,297,690 | 10/1981 | Baker | 340/690 |
| 4,345,238 | 8/1982 | Weir | 200/61.45 R |
| 4,364,033 | 12/1982 | Tsay | 340/690 |
| 4,381,504 | 4/1983 | Bitko | 340/689 |
| 4,390,922 | 6/1983 | Pelliccia | 200/61.45 R |
| 4,565,010 | 1/1986 | Herman | 340/689 |
| 4,575,713 | 3/1986 | Piper | 340/689 |
| 4,689,997 | 9/1987 | Windisch | 340/690 |
| 4,797,661 | 1/1989 | Wiley | 340/669 |
| 4,945,347 | 7/1990 | Perry | 200/61.45 |
| 5,285,032 | 2/1994 | Robinette | 200/61.48 |

Primary Examiner—Jeffery A. Hofsass
Assistant Examiner—Benjamin C. Lee

[57] ABSTRACT

An earthquake detector motion sensitive device capable of detecting any one or more of the conditions of angular tilt, vibration or acceleration having an electrically conductive pendulum with a main mass located next to its suspension point and having an extension arm that extends below the main mass. When the pendulum suspension point is acted upon by an outside force of vertical or lateral motion, the extension arms lower end will travel farther than the distance that the main mass travels, causing the lower end of the pendulum extension arm to mechanically amplify the movement of the main mass. At the lower end of the extension arm is an upper switch contact which is suspended into the opening of a lower switch contact. During seismic activity the two switch contacts will be caused to touch each other which will activate an audio signaling device and charge an electrolytic capacitor. When the pendulum swings back toward its normal state of equilibrium, the two switch contacts will no longer be touching and the audio signaling device will continue to produce an audio output until the current in the electrolytic capacitor is discharged. This cycle of pendulum motion continues until the seismic activity acting upon the pendulum suspension point subsides and the pendulum returns to its normal state of equilibrium. The use of the electrolytic capacitor causes the audio output to produce a unique and distinguishable sound and allows the circuit to continue its audio output for an extended duration even when the pendulum switch contacts make minimal contact. Sensitivity adjustment is made by turning in or out an adjusting screw which moves the lower switch contact closer or farther away from the upper switch contact.

12 Claims, 3 Drawing Sheets

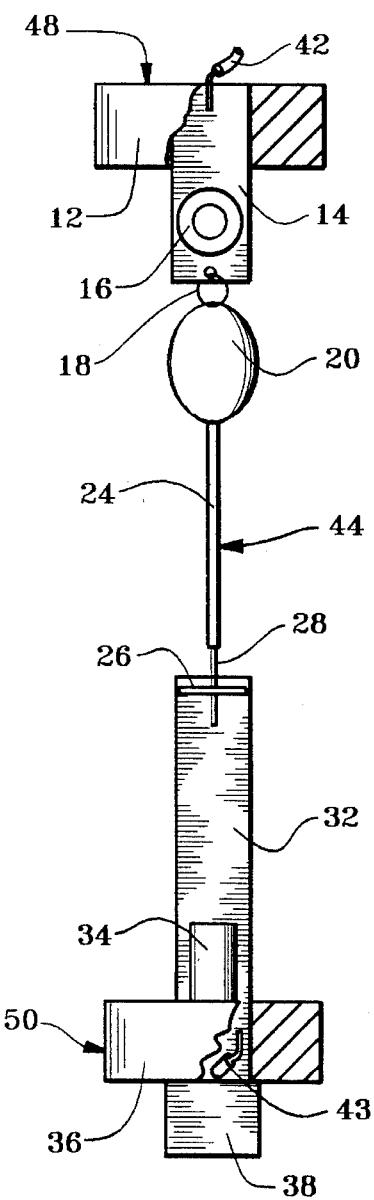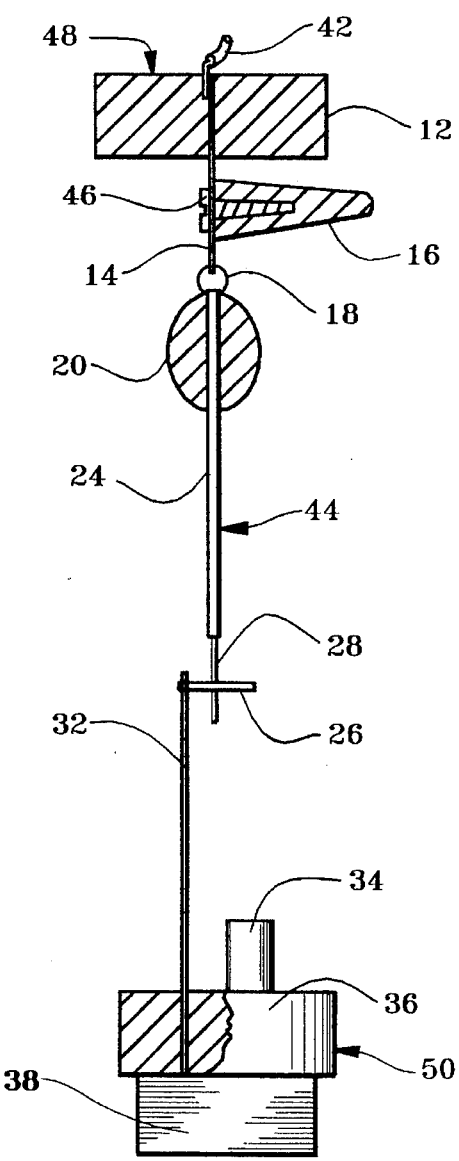
Fig. 2
Fig. 3

EARTHQUAKE DETECTOR MOTION SENSITIVE DEVICE

BACKGROUND-FIELD OF INVENTION

This invention relates to motion detectors and devices designed to detect earth movement.

BACKGROUND-DESCRIPTION OF PRIOR ART

A review of the prior art reveals various inventions designed to detect earthquakes. The majority of these devices utilize various pendulum-type switches that are suspended within a housing. When an outside force acts upon the pendulum, electrical contacts are caused to close and an alarm circuit is triggered. The configurations of the pendulum switch vary in many ways to include the amount of mass, mass center of gravity, pendulum length and switch sensitivity adjustment. The pendulum switches in U.S. Pat. No. 2,826,655 to Wurm, 1958, Mar. 11, U.S. Pat. No. 3,359,550 to Christensen, 1967, Dec. 19, U.S. Pat. No. 4,262,289 to Rivera, 1981, Apr. 14, U.S. Pat. No. 4,297,690 to Baker, 1981, Oct. 27, and U.S. Pat. No. 4,381,5041 to Bitko, 1983, Apr. 26, utilize a pendulum mass that is attached at the bottom end of a relatively long pendulum arm. This configuration limits the potential sensitivity and reaction time of the pendulum switch due to the positioning of the main mass at the lower end of the length of the pendulum arm.

U.S. Pat. No. 4,945,347 to Perry, 1990, Jul. 31, does attempt to solve the problem of pendulum sensitivity but his design incorporates its own inherent problems. Perry's design utilizes a pendulum that is pivotally mounted between its ends where the portion of the arm above the pivot point extends through a small opening in a contact plate. One deficiency in this arrangement is the utilization of a pivot point or fulcrum where free movement of the pendulum mass is inhibited to a certain extent by friction. Another problem is the amount of mass that extends above the pivot point of the main pendulum mass which includes the mass of the pendulum arm and the mass of the pivot collar. This arrangement causes the combined mass of the pendulum arm and the pivot collar to counter balance the effect of the main pendulum mass which reduces pendulum sensitivity and reaction time.

Sensitivity adjustment of prior devices varies from nonexistent to complex. In the Baker patent, sensitivity adjustment is designed in a simple manner but as stated within the patent disclosure the adjustment is made by "trial and error" and access to the adjustment is inhibited by the unit's housing. In the Bitko design, sensitivity adjustment is made by loosening a set screw and raising or lowering the main pendulum mass relative to a fixed lower contact and/or by pendulum suspension bracket adjustment by loosening a lock screw and physically moving the bracket and retightening the screw. This type of adjustment is also trial and error and does not easily allow for close tolerance adjustments. The Rivera sensitivity adjustment is capable of providing close tolerance adjustments but is complex in its mechanical design.

Circuitry in prior devises range from a simple switch circuit to complex logic circuitry. For example, a simple switch circuit is found in U.S. Pat. No. 4,689,997 to Windisch, 1987, Sep. 1, which depicts a separate alarm device to be utilized in conjunction with his motion detector. The Rivera patent and the Perry patent disclose schematics that consist of a pendulum-activated switch, a power source and an audio signaling device. When the pendulum-activated switch is closed, power is supplied to the audio signaling device. The deficiency in this design is that the audio signaling device will only be activated for a duration equal to or less than the duration of the pendulum switch contact closing time. Duration of pendulum switch contact closing is directly proportional to the magnitude of a given seismic event. If for example a seismic event is very minimal, then pendulum switch contact closure time and contact pressure will also be minimal and the duration and amplitude of the audio signal will be insignificant. Pendulum switch contact pressure is also an important factor because if contact is minimal then a resistance is induced between the contacts which inhibits the flow of current to the audio signaling device and reduces the audio output efficiency. Many types of audio signaling devices are available for use within these types of circuits such as mechanical buzzers, electronic buzzers and piezoelectric buzzers. Each type has its own advantages and disadvantages depending upon the type of application in which they will be used. One characteristic that these types of audio signaling devices have in common is the amount of time it takes them to build up to maximum audio output once current is applied to them. This too is an important factor because if pendulum switch contact closure is minimal then there will not be enough time or current to allow the audio signaling devices to reach maximum efficiency. Even during moderate seismic activity these types of circuits do not provide adequate output in terms of audio signal levels and duration. A circuit that solves the problem of pendulum switch contact closure time and contact closure pressure is disclosed in the Baker patent which utilizes various components such as two separate batteries, a diode, a relay, a switch and an audio signaling device. The pendulum switch on the Baker device triggers a relay which supplies power to the audio signaling device. The relay is held closed in this circuit until the relay holding current is manually removed by opening a switch. The problem with this circuit and those like it is that once the detector is triggered it doesn't automatically shut off until either the battery runs down or someone resets the circuit. Another example of this type of circuit is found in the Bitko patent with the exception that his circuit also provides a delay time before arming itself, The Bitko circuit also requires resetting once the alarm has been triggered. These designs can cause user frustration and inconvenience and do not allow for the detection of motion stabilization because they do not automatically reset after earth movement has subsided.

OBJECTS AND ADVANTAGES

Accordingly, several objects and advantages of my invention are:

(a) to provide an earthquake detector motion sensitive device that utilizes a pendulum-activated switch which will be extremely sensitive to minimal seismic activity;

(b) to provide an earthquake detector motion sensitive device that utilizes an easily accessible sensitivity adjustment which can be adjusted without disturbing the equilibrium of the pendulum;

(c) to provide an earthquake detector motion sensitive device that utilizes a circuit that provides adequate current to an audio signaling device even during minimal seismic activity;

(d) to provide an earthquake detector motion sensitive device with an audio signaling circuit that produces a unique sound so that its output can be easily distinguished from surrounding sounds;

(e) to provide an earthquake detector motion sensitive device that utilizes highly conductive corrosion resistant material for pendulum switch contacts and pendulum suspension points;

(f) to provide an earthquake detector motion sensitive device that automatically resets itself after seismic activity subsides;

(g) to provide an earthquake detector motion sensitive device that utilizes an operational and battery test system that simulates seismic activity;

(h) to provide an earthquake detector motion sensitive device that mounts easily to a wall surface and provides for simple initial leveling adjustment.

Further objects and advantages are to provide an earthquake detector motion sensitive device that has a compact, aesthetically pleasing appearance and can be used easily and conveniently for the detection of seismic activity. Still further objects and advantages will become apparent from a consideration of the ensuing description and drawings.

DRAWINGS FIGURES

FIG. 2 is a vertical elevation partially in section showing the pendulum switch apparatus of this invention.

FIG. 3 is a fight side view partially in section showing the pendulum switch apparatus of this invention.

Figure 1:
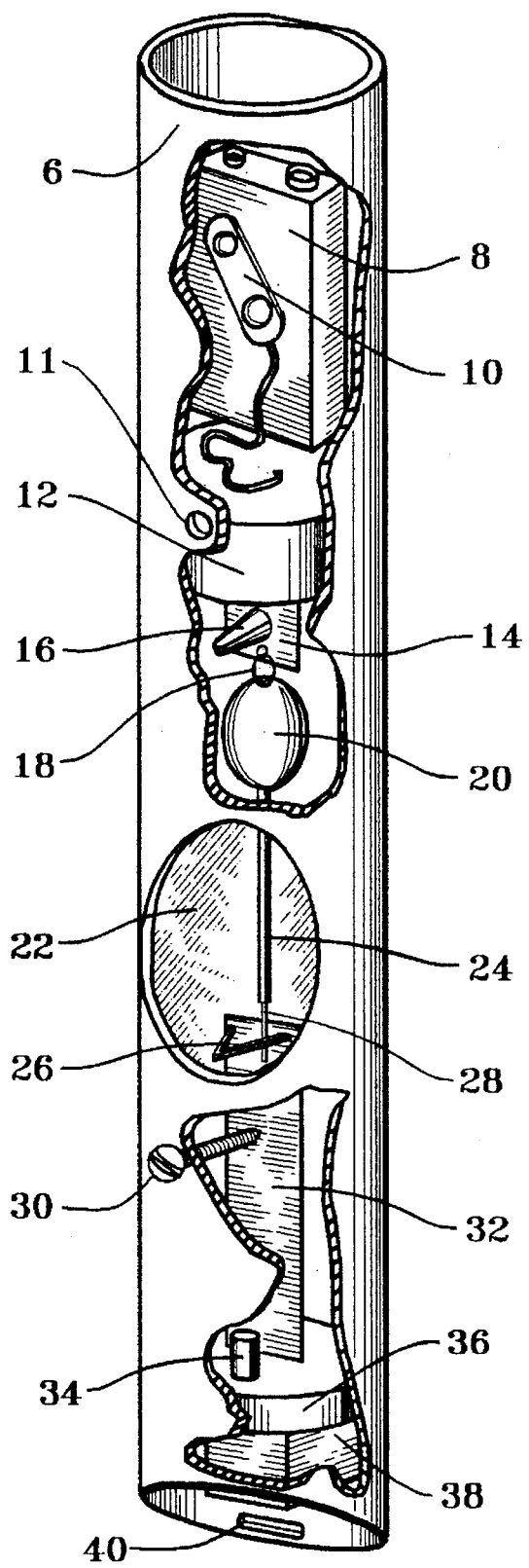
FIG. 1 is a partially cut away perspective view of the preferred embodiment of an earthquake detector motion sensitive device according to the invention.

| Reference Numerals In Drawings | | | |
|---|---|---|---|
| 6 | housing | 30 | sensitivity adjustment screw |
| 8 | battery | 32 | lower switch contact support tab |
| 10 | battery connector | | |
| 11 | upper mounting hole | 34 | electrolytic capacitor |
| 12 | pendulum support insert | 36 | lower switch contact support insert |
| 14 | pendulum suspension tab | | |
| 16 | test button | 38 | audio signaling device |
| 18 | pendulum suspension loop | 40 | lower mounting slot |
| 20 | main mass | 42 | electrical lead from circuit |
| 22 | clear plastic window | 43 | electrical lead from circuit |
| 24 | pendulum extension arm | 44 | pendulum |
| 26 | lower switch contact | 46 | screw |
| 28 | upper switch contact | 48 | pendulum assembly |
| | | 50 | lower switch contact support assembly |

DESCRIPTION FIGS. 1 TO 5

FIGS. 1–5 illustrate an earthquake detector motion sensitive device according to the invention. The device includes a pendulum 44 consisting of a pendulum extension arm 24, an upper switch contact 28, a main mass 20 and a pendulum suspension loop. The pendulum suspension loop 18 is attached to the upper end of the pendulum extension arm 24. The upper switch contact 28 is attached to the lower end of the pendulum extension arm 24 and the main mass 20 is attached at the upper end of the pendulum extension arm 24 next to and below the pendulum suspension loop 18. The pendulum suspension loop 18 is linked through a hole in a pendulum suspension tab 14. The pendulum suspension tab 14 is constructed of thin flexible brass and is secured into the center of a pendulum support insert 12. The pendulum extension arm 24 is constructed of thin hollow brass tubing. Attached to the pendulum suspension tab 14 is a test button 16 which is secured by a screw 46. This arrangement of parts is known as a pendulum assembly 48

A lower switch contact 26 is secured to a lower switch contact support tab 32. The lower switch contact support tab 32 is constructed of thin flexible brass and is secured into the center of a lower switch contact support insert 36. The lower switch contact support insert 36 is also the mounting point for an electrolytic capacitor 34 and an audio signaling device 38. This arrangement of parts is known as a lower switch contact support assembly 50.

A sensitivity adjustment screw 30 is threaded through the front side of a housing 6 and makes contact with the lower switch contact support tab 32.

Figure 4:
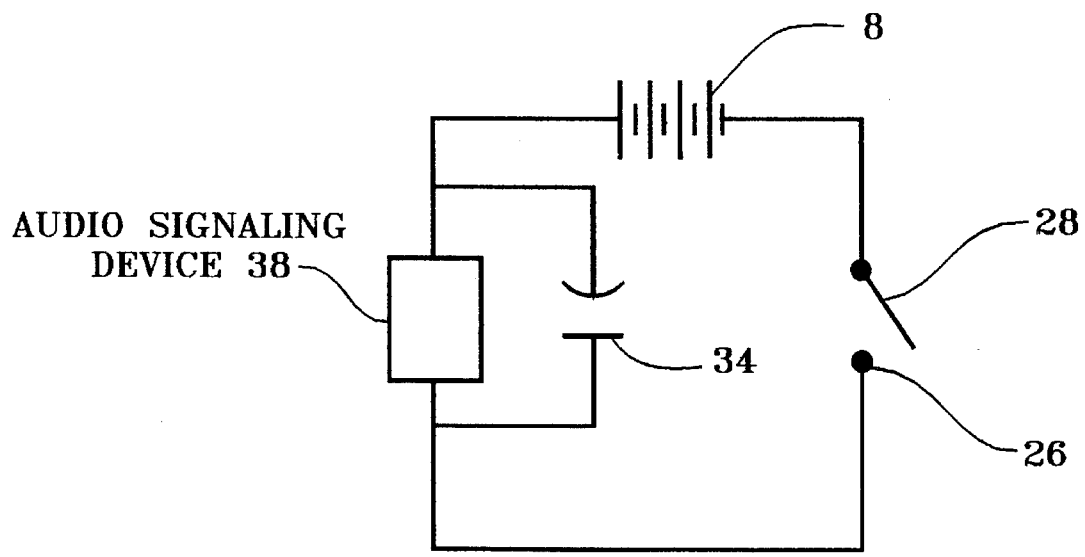
FIG. 4 is a schematic diagram of the circuitry of the preferred embodiment of an earthquake detector motion sensitive device according to the invention.
Figure 5:
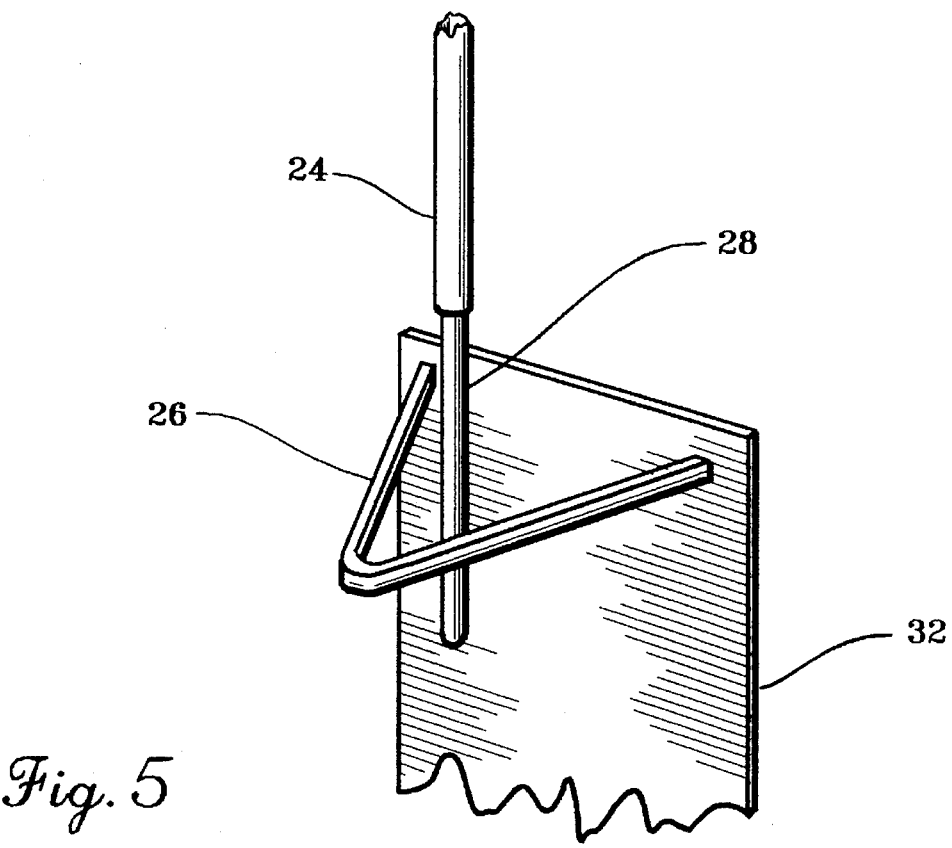
FIG. 5 is a fragmentary perspective view showing the pendulum switch contacts of this invention.

Referring now to FIG. 4, there is shown a schematic diagram showing a battery 8 which has its negative terminal connected to the negative input of the audio signaling device and its positive terminal is operatively connected to the upper switch contact 28. Another wire is operatively connected between the lower switch contact 26 and the positive input of the audio signaling device 38. An electrolytic capacitor 34 is connected to the audio signaling device 38 having its positive lead connected to the positive input of the audio signaling device 38 and its negative lead connected to the negative input of the audio signaling device 38.

OPERATION FIGS. 1 TO 5

The earthquake detector motion sensitive device is designed to detect various levels of seismic activity depending on the adjustment of the sensitivity adjustment screw 30 which can be set by the user after the detector has been installed and leveled on a structural surface of a building. The mounting of the earthquake detector is accomplished by inserting a screw through an upper mounting hole 11 which passes through both sides of a housing 6 and securing the screw into the mounting surface until the housing 6 is secure. The back side of the housing 6 is cut flat so that the housing 6 will be more secure against the mounting surface. The housing is then leveled to a vertical left and right position by viewing the relative positions of the upper switch contact 28 and the lower switch contact 26 through a clear plastic window 22 so that the upper switch contact is in the approximate inside center of the lower switch contact 26. A screw is then inserted through the approximate middle of a lower mounting slot 40 and secured to the mounting surface until the housing 6 is secure. Any minor vertical adjustments can be made by loosening the lower mounting screw and moving the lower end of the housing 6 either left or fight and then retightening the screw. If the mounting surface is not perfectly vertical, compensation can be made by turning in or out the sensitivity adjustment screw 30 until the upper switch contact 28 is in the approximate inside center of the lower switch contact 26. The lower switch contact support tab 32 is constructed of thin flexible brass and is preset so that initially it leans forward towards the front of the housing 6 so that it can be adjusted to its approximate centered position by the pressure exerted upon it by the sensitivity adjustment screw 30. This is to allow for precise leveling when compensating for mounting surface vertical missalignment.

Power is supplied by connecting a battery 8 to a battery connector 10. The battery is then inserted into the upper opening of the housing 6 for storage. The battery connector 10 is attached to the pendulum suspension tab by a positive lead 42 and the battery connector negative lead is connected to the negative input of the audio signaling device 38. The positive input of the audio signaling devise is attached to the lower switch contact support tab 32 by a lead 43. The electrolytic capacitor 34 is attached across the audio signaling device 38 having its positive lead connected to the positive input of the audio signaling device 38 and its negative lead connected to the negative input of the audio signaling device 38.

The design of the pendulum 44 causes it to be very sensitive to vertical and lateral motion. This is because the main mass 20 is located at the upper end of the pendulum 44 next to the pendulum suspension loop 18. It is believed that the closer a given pendulum mass is to its suspension point, the greater the degrees of arc will be of that mass after its suspension point has been acted upon by a given force of lateral motion. It is also believed that the closer the pendulum mass is to the pendulum suspension point, the faster its reaction time will be when traveling through its degrees of arc and when re-obtaining its equilibrium after the lateral motion subsides. Further pendulum sensitivity enhancement is obtained by the action of the pendulum extension arm 24 which extends the length of the pendulum 44 and acts to amplify the distance of travel of the upper switch contact 28 relative to the distance of travel of the main mass 20.

During seismic activity the housing 6 is acted upon by forces of acceleration. The housing 6 supports the pendulum 44 which is also acted upon by the same forces of acceleration at its suspension point. The pendulum 44 resists the force of acceleration due to its sate of equilibrium and will remain in its relative state of equilibrium for a period of time until the force of acceleration overcomes the kinetic energy stored by the pendulum 44. It would appear to an observer undergoing the same force of acceleration that the housing 6 was staying in its relative state of rest and that the pendulum 44 was moving to the side of the housing 6 when in fact the opposite is true. During this relative movement between the upper switch contact 28 and the lower switch contact 26, providing that the seismic activity is of sufficient magnitude relative to the sensitivity adjustment setting, the two switch contacts will collide with each other causing the pendulum switch to be closed. When the pendulum switch is in the closed position power is applied across the inputs to the audio signaling device 38 and the electrolytic capacitor 34. The audio signaling device 38 will emit a warning sound and the electrolytic capacitor 34 will instantly become fully charged. When the seismic activity stops or reverses its direction of motion the upper switch contact 28 and the lower switch contact 26 will separate their contact with each other and the switch will become open. It is at this point that the fully charged electrolytic capacitor 34 transfers its stored electrical energy to the audio signaling device 38 and causes it to continue to emit a warning signal even though the switch contacts 28 and 26 remain in the open condition. The length of time that the audio signaling device 38 will continue to emit a warning is totally dependent upon the capacitance value of the electrolytic capacitor 34 and the current drain of the particular type of audio signaling device 38. Generally, a capacitance value of between 150 microfarads and 500 microfarads is sufficient and will allow audio signal run times of between 0.5 and 2 seconds before the audio signal dissipates. This bleed down of the electrolytic capacitor also has another unique effect in that the sound output of the audio signaling device also bleeds down in amplitude and causes the sound output to be distinctively different. This makes the alarm warning signal of the earthquake detector motion sensitive device easily distinguishable from other sounds. This cycle of switch closure and opening continues until the seismic activity subsides, at which time the pendulum 44 will automatically return to its normal state of equilibrium and the pendulum activated switch will remain open until acted upon by another outside force.

Sensitivity adjustment is made by turning in or out the sensitivity adjustment screw 30 which when turned in will push against the lower switch contact support tab 32 and will position the inside angular corner of the lower switch contact 26 into closer proximity of the upper switch contact 28. When the sensitivity adjustment screw 30 is turned out, the lower switch contact support tab 32 springs back toward its preset position and this widens the gap between the lower switch contact 26 and the upper switch contact 28 which renders the the earthquake detector less sensitive. This arrangement of the sensitivity adjustment allows for a very close tolerance between the switch contacts 26 and 28, so that even slight vibrations can be detected.

CONCLUSIONS, RAMIFICATIONS, AND SCOPE OF INVENTION

Accordingly, the reader will see that the earthquake detector motion sensitive device of the invention provides a highly sensitive device for the detection of seismic activity that is convenient to use and is aesthetically pleasing. It provides for early detection of and verification of seismic activity by allowing the user to be warned at the onset of seismic activity. Often times, persons experiencing earthquakes will pause to seek some kind of visual or audible verification of seismic activity during its initial onset. This is a natural trait of human nature due to the fact that other events can sometimes be confused as seismic activity such as low frequency sounds produced by large trucks, the closing of heavy garage doors or even the normal sounds of a house settling. The earthquake detector motion sensitive device provides early warning which allows the user to instantly verify if and when they are experiencing seismic activity. This is very important because the warning will remove doubt from the users mind which will save valuable seconds that can better be used to prepare for safety should the earthquake continue or grow in magnitude. The other advantage of the earthquake detector is that it will provide a method for someone sleeping to be awakened and warned of a seismic event. The unique sound that the earthquake detector motion sensitive device produces is another advantage, in that it can not be confused with the standard type sound produced by smoke detectors. The sound will also stand out during normal home sound activity due to its descending decibel pattern of output which makes it more readily noticeable to a user.

After a relatively large earthquake, the likelihood of a large after shock is great. Thousands of such aftershocks have been recorded after a large earthquake and can continue for many months. This tends to make most people very nervous. The earthquake detector motion sensitive device can offer some peace of mind in that it will allow the user to better ignore other sounds that can sometimes be initially confused as an earthquake.

Although the description above contains many specificities, these should not be construed as limiting the scope of the invention but as merely providing illustrations of some of the presently preferred embodiments of this invention.

For example the housing can have other shapes, such as square, rectangular, oval, etc.; the flexible brass described in the invention can be replaced with spring steel, etc.

Thus the scope of the invention should be determined by the appended claims and their legal equivalents, rather than by examples given.

I claim:

1. An earthquake detector motion sensitive device comprising:

(a) a housing;
    (b) a pendulum having normally upper and lower ends and a main mass at said upper end, said lower end extends down below said main mass for a predetermined length;
    (c) a pendulum suspension means mounting said pendulum to the inside upper end of said housing, whereby said pendulum has a generally vertical position relative to gravitational forces;
    (d) a lower switch contact having an opening to accept the suspension of said pendulum lower end into said lower switch contact, whereby said pendulum lower end remains at a normally fixed distance from said lower switch contact;
    (e) a lower switch contact support means for mounting said lower switch contact to the inside lower end of said housing;
    (f) a sensitivity adjustment screw for adjusting the relative proximity of said pendulum lower end and said lower switch contact, said sensitivity adjusting screw is threaded through said housing and operatively coupled to said lower switch contact support means; whereby to provide relative positioning between said pendulum lower end and said lower switch contact;
    (g) an electrical means connecting said pendulum lower end and said lower switch contact with an audio signaling device for translating any physical contact between said pendulum lower end and said lower switch contact into an audible signal;
    (h) an electrolytic capacitor for sustaining said audible signal for a predetermined duration of time after said pendulum lower end has engaged said lower switch contact and has returned to its normal state of equilibrium; whereby said audio signaling device will continue to sustain for said predetermined duration of time said audible signal after said pendulum lower end maintains separation from said lower switch contact; and
    (i) a test button for mechanically testing said audible signal, said test button is attached to said pendulum suspension means, whereby physical movement of said test button will disturb said pendulum and cause said pendulum lower end to physically engage said lower switch contact.

2. An earthquake detector motion sensitive device according to claim 1 wherein said pendulum suspension means comprises a pendulum suspension loop and a pendulum support tab;

(a) said pendulum support tab consists of an elongated flexible strip of brass, having normally upper and lower ends and said pendulum suspension loop is linked through a hole in said lower end of said pendulum support tab, said pendulum support tab upper end is attached to the inside upper surface of said housing;
    (b) said test button is attached to said pendulum support tab and protrudes through said housing.

3. An earthquake detector motion sensitive device according to claim 1 wherein said lower switch contact support means is a lower switch contact support tab consisting of an elongated strip of brass attached to the inside lower end of said housing.

4. An earthquake detector motion sensitive device according to claim 1 wherein said lower switch contact has a triangular shape with a triangular opening.

5. An earthquake detector motion sensitive device according to claim 1 wherein said pendulum is made of electrically conductive tubular brass.

6. An earthquake detector motion sensitive device according to claim 1 wherein said main mass is made of lead.

7. An earthquake detector motion sensitive device according to claim 1 wherein said electrical means comprises a source of electrical power that is operatively connected to said pendulum lower end and said audio signaling device, said audio signaling device is operatively connected to said lower switch contact, said electrolytic capacitor is operatively connected in parallel to said audio signaling device whereby engagement of said pendulum lower end and lower switch contact will cause said audio signaling device to produce said audible signal.

8. An earthquake detector motion sensitive device comprising: a pendulum-activated switch consisting of a pendulum and a lower switch contact, said pendulum having normally upper and lower ends and a main mass attached at said upper end, said pendulum lower end extends down below said pendulum main mass for a predetermined length, and a pendulum suspension means for suspending said pendulum in a normally vertical position into an opening of said lower switch contact in such a manner that said pendulum lower end remains at a fixed distance from the inside edges of said lower switch contact until said pendulum is disturbed by a force of acceleration, said pendulum activated switch is operatively suspended inside a housing;

(a) said pendulum-activated switch is operatively connected to an alarm means for producing an audible signal when said pendulum-activated switch is caused to close;
    (b) an electrolytic capacitor for sustaining said audible signal for a predetermined duration of time after said pendulum-activated switch has been caused to close and has returned to its normal state of equilibrium;
    (c) a sensitivity adjustment screw for adjusting the relative proximity of said pendulum lower end and said lower switch contact, said adjusting screw is threaded through said housing and is operatively coupled to said lower switch contact whereby providing relative positioning between said pendulum lower end and said lower switch contact; and
    (d) a test button for mechanically testing said audible signal, said test button is attached to said pendulum suspension means whereby physical movement of said test button will disturb said pendulum and cause said pendulum lower end to physically engage said lower switch contact.

9. An earthquake detector motion sensitive device according to claim 8 wherein said lower switch contact has a triangular shape and a triangular opening.

10. An earthquake detector motion sensitive device according to claim 8 wherein said pendulum is made of electrically conductive tubular brass.

11. An earthquake detector motion sensitive device according to claim 8 wherein said main mass is made of lead.

12. An earthquake detector motion sensitive device according to claim 8 wherein said alarm means comprises a source of electrical power that is operatively connected to said pendulum lower end and an audio signaling device, said audio signaling device is operatively connected to said lower switch contact, said electrolytic capacitor is operatively connected in parallel to said audio signaling device whereby engagement of said pendulum lower end and said lower switch contact will cause said audio signaling device to produce said audible signal.

* * * * *